United States Patent [19]
Adams

[11] Patent Number: 5,452,972
[45] Date of Patent: Sep. 26, 1995

[54] INTERMEDIATE DECK STRUCTURE FOR VEHICLES

[76] Inventor: Thomas E. Adams, 3961 E. River Dr., Fort Myers, Fla. 33916

[21] Appl. No.: 311,052

[22] Filed: Sep. 23, 1994

Related U.S. Application Data

[62] Division of Ser. No. 66,488, May 24, 1993, Pat. No. 5,375,534.

[51] Int. Cl.⁶ .................................................. B61D 45/00
[52] U.S. Cl. ............................. 410/89; 410/149; 292/121; 292/163
[58] Field of Search ..................................... 410/144, 145, 410/146, 147, 148, 149, 150, 89, 18, 132, 135, 138, 139, 141, 142, 121; 105/370, 372, 371, 375; 292/163, 121, 102, 109

[56] References Cited

U.S. PATENT DOCUMENTS

| | | | |
|---|---|---|---|
| 2,899,227 | 8/1959 | Gschwend | 292/163 |
| 3,053,549 | 9/1962 | Mutto | 410/149 |
| 3,075,478 | 1/1963 | Elsner | 410/149 |
| 3,082,707 | 3/1963 | Prendergait | 410/149 |
| 3,129,470 | 4/1964 | Schneider | 292/163 X |
| 3,911,832 | 10/1975 | Vandergriff | 410/135 X |
| 4,191,109 | 3/1980 | Wickenberg | 410/135 X |
| 4,256,425 | 3/1981 | Burgess et al. | 410/150 X |
| 5,042,854 | 8/1991 | Huang et al. | 292/163 X |

FOREIGN PATENT DOCUMENTS

0005960  12/1979  European Pat. Off. ............... 410/129

Primary Examiner—Michael S. Huppert
Assistant Examiner—Stephen Gordon
Attorney, Agent, or Firm—Robert G. Mentag

[57] ABSTRACT

A deck structure for use in supporting cargo at an intermediate level above the floor or bed of a trailer van, or the like. A first embodiment includes a first deck section pivotally mounted on a side wall of a trailer van and movable to a horizontal load position, and back up to a vertical stored position against the side wall where it is releasably held by a spring slam bolt engaged with a height saving angle locking rail. In the first embodiment a second section of the deck is pivotally connected to the first section and it is also movable between a horizontal load position and a vertical stored position against the side wall, and when it is in the vertical stored position it is hanging from the first section and is configured such that it nests closely in the first deck section to provide a slender storing intermediate deck structure. When the first and second deck sections are in a horizontal load position, the second section has an outer end which is selectively provided with either a spring biased, telescopically mounted load bracket, or a cap style load bracket, that is operatively seated on a load track rail on the trailer van wall opposite to the wall on which the first deck section is hinged. Two intermediate decks may be mounted in vertically spaced apart positions, at two different levels, above the floor of a trailer van.

3 Claims, 5 Drawing Sheets

INTERMEDIATE DECK STRUCTURE FOR VEHICLES

This is a division of application Ser. No. 08/066,488 filed on May 24, 1993 and issued as U.S. Pat. No. 5,375,534 on Dec. 27, 1994.

BACKGROUND OF THE INVENTION

1. Field of the Invention

The field of art to which this invention pertains may be generally located in the class of devices relating to land vehicles. Class 280, Land Vehicles, United States Patent Office Classification, appears to be the applicable general area of art to which the subject matter similar to this invention has been classified in the past.

2. Description of the Prior Art

This invention relates generally to intermediate deck structures for use in vehicles, for example, truck and trailer vans, railway cars, freight containers, and the like. Heretofore, various types of intermediate deck structures have been proposed for supporting freight articles of various shapes and weights above the horizontal bed or floor of a transport van, and the like, in order to increase the load carrying ability of a van and to maximize the use of the available cubic capacity of a van. The U.S. Pat. No. 3,911,832 to Vandergriff discloses a prior art intermediate deck structure for use in railway cars, truck and trailer vans, and the like, and which includes a first section pivotally connected at its outer end to one side wall of a vehicle, or the like, and which is adapted to be pivoted between a stored vertical position adjacent said one side wall of a vehicle and a horizontal operative loading position with its inner end extending inwardly from said side wall. A second section of the Vandergriff intermediate deck has a pair of arms extended from its inner end which are pivotally connected to the first section at a point between the inner and outer ends thereof. The second section of the intermediate deck is adapted to be stored adjacent said one side wall of the vehicle below the first section of the intermediate deck in a position extending downwardly from the outer end of a stored first section. The second section is adapted to be pivoted relative to the first section during pivoting of the first section to a horizontal loading position, whereby the second section can also be moved to a horizontal loading position with the outer end of the second section supported by a pair of load brackets engaged with a load rail on the opposite side wall of the vehicle. A problem encountered when the last described intermediate deck structure is used is that when the two deck sections are stored against said one side wall of the vehicle the load bracket on the second section extends downwardly to a position where it can interfere with and damage cargo and boxes sitting on the main floor of the vehicle. When the intermediate deck structure is in a horizontal loading position, it is also subject to being accidentally hit and damaged, and because of no reinforcement means to resist side impacts, the load brackets are bent, by the fork members of a fork truck in the process of loading and unloading a vehicle. The load brackets are also subject to damage if the deck second section falls or swings down to a point where the load brackets hit the floor of a vehicle.

A further problem inherent in the Vandergriff intermediate deck is that it can not be used on trailer vans which have wheel boxes that are movable relative to a trailer van floor, but which are fixed relative to the trailer van wheels and axles, so that the trailer van can be raised up by an air lift suspension to bring the trailer van floor and top of the wheel boxes level with a loading dock to permit fork lift loading and unloading, since the movement of such wheel boxes would be interfered with by the low stored second section of the intermediate deck. Still another problem encountered in the use of the aforementioned Vandergriff intermediate deck is that the inner ends of the tubes forming the side frame members of the second deck sections are seated in the inside of the inner ends of the channels forming the side frame members of the first section, and said inner ends of said tubes exert a concentrated pressure on said inner ends of said first section channels which results in many instances in extruded metal fatigue and breaking of the inner ends of the first section channels. The same inherent metal fatigue problem exists on the extreme edge of said tubes where the load bracket on the inside is cantilevered outward so the load bracket hooks can meet the slots in the wall load track rail. A further problem encountered in the use of the aforementioned prior art intermediate deck is that the load brackets employed in said intermediate deck structure are subject to jumping out of the wall load track rail slots, causing the load brackets to retract under a load on the deck, and dropping the load onto the cargo positioned underneath the intermediate deck.

SUMMARY OF THE INVENTION

The intermediate deck of the present invention includes a first section having having an outer end pivotally mounted to a side wall of a freight container, such as the wall of a container truck or trailer van by a hinge means, and which is adapted to be pivoted to a vertical stored position against said side wall. A second section of the intermediate deck has an inner end pivotally connected to the inner end of the first section so that when it is pivoted to a vertical stored position it hangs from the first section of the intermediate deck, and its shape and configuration is such that it nests closely into the first section, to provide a slender stored intermediate deck which does not protrude inwardly into the cargo area of a trailer van as far as the prior art intermediate decks, so as to provide more usable cargo space when the deck is in a stored position. The second section of the deck has a pair of load brackets operatively attached to the outer end thereof, and when the intermediate deck is in a stored position against the wall of a vehicle, the load brackets are stored in a closely nested position above an elongated horizontal leg of the hinge means to maintain them in a protected position so that they do no damage to cargo positioned therebelow or receive damage by lift truck forks loading and unloading cargo from the floor of the trailer van.

The first and second sections of one embodiment of the intermediate deck have side frame members provided with reinforcing bands used with spring loaded telescopically mounted load brackets in the outer ends of the side frame members of the second section for engagement with slots in a load track rail on a trailer van wall, opposite to the wall on which the hinge means is mounted. The outer ends of the side frame members of a second embodiment of the intermediate deck is provided with cap style load brackets which are adjustably bolted in place on said side frame members and are adapted to be seated on a "Z" load track on a trailer van wall, opposite to the wall on which the hinge means is mounted. A trailer van may be provided with a first plurality of the intermediate decks at a first level above the floor of the trailer van, and a second plurality of intermediate decks at positions spaced above the first plurality of decks. The intermediate deck is constructed so as to be releasably 5,452,972 retained in a stored position on a trailer van wall by a spring latching bolt coacting with a wall mounted novel locking rail.

DETAILED DESCRIPTION OF THE PREFERRED EMBODIMENTS

Figure 1:
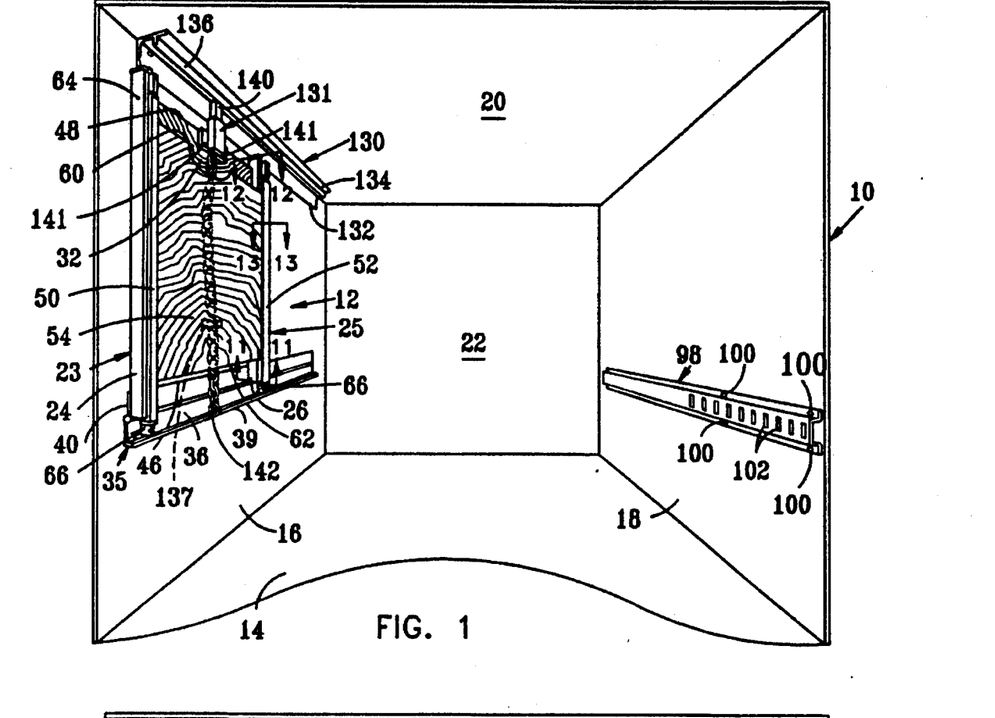
FIG. 1 is an elevation perspective view of a portion of the interior of a typical highway trailer van and showing a first embodiment of the invention in a stored position on one of the side walls of the trailer van.

Referring now to the drawings, and in particular to FIG. 1, the numeral 10 generally designates a cargo container in the form of a typical highway trailer van which may be provided with one or more intermediate loading decks, generally indicated by the numeral 12, and which are made in accordance with the principles of the present invention. Although the invention is described hereinafter in connection with the trailer van 10, it will be understand that the intermediate loading deck of the present invention may be utilized in connection with any type of cargo container, such as a truck, truck trailer, railway car, or any stationary storage space or container. The cargo or storage material which may be disposed on the intermediate deck 12 may be of any type of dry freight, as well as other types of freight, such as produce, frozen foods, or livestock.

Figure 2:
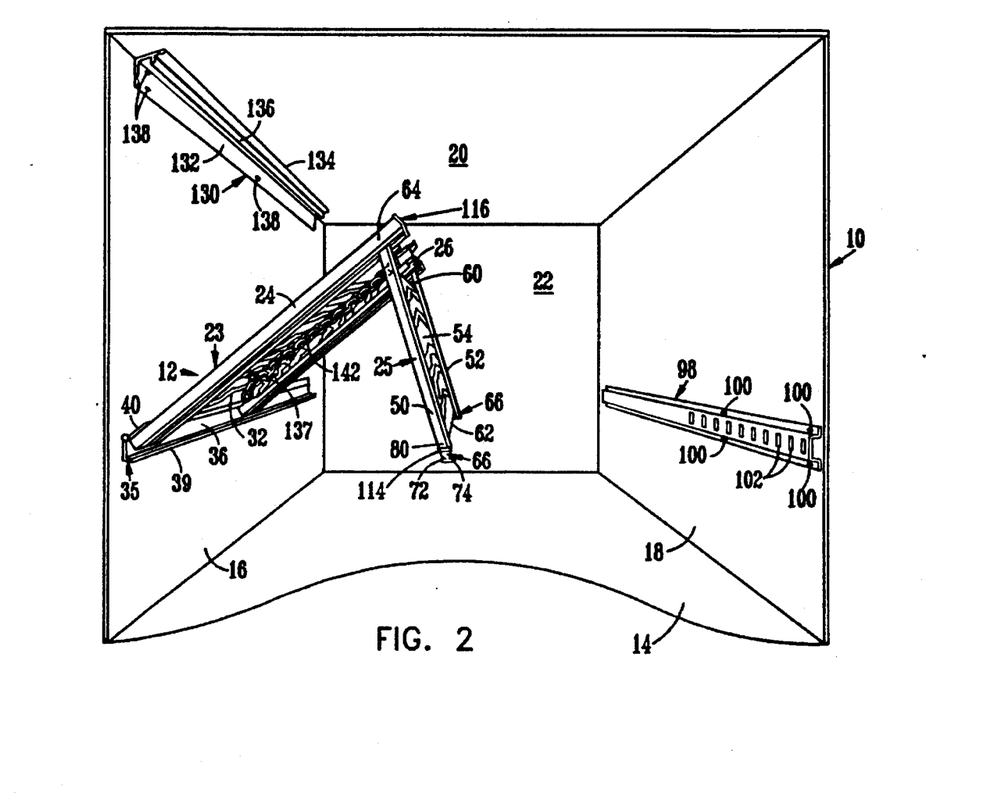
FIG. 2 is an elevation perspective view of a portion of the interior of a trailer van, and showing the first embodiment intermediate deck structure of FIG. 1 in a position illustrating the movement of the two sections of the intermediate deck from a stored position to a position midway to a horizontal load carrying position.
Figure 3:
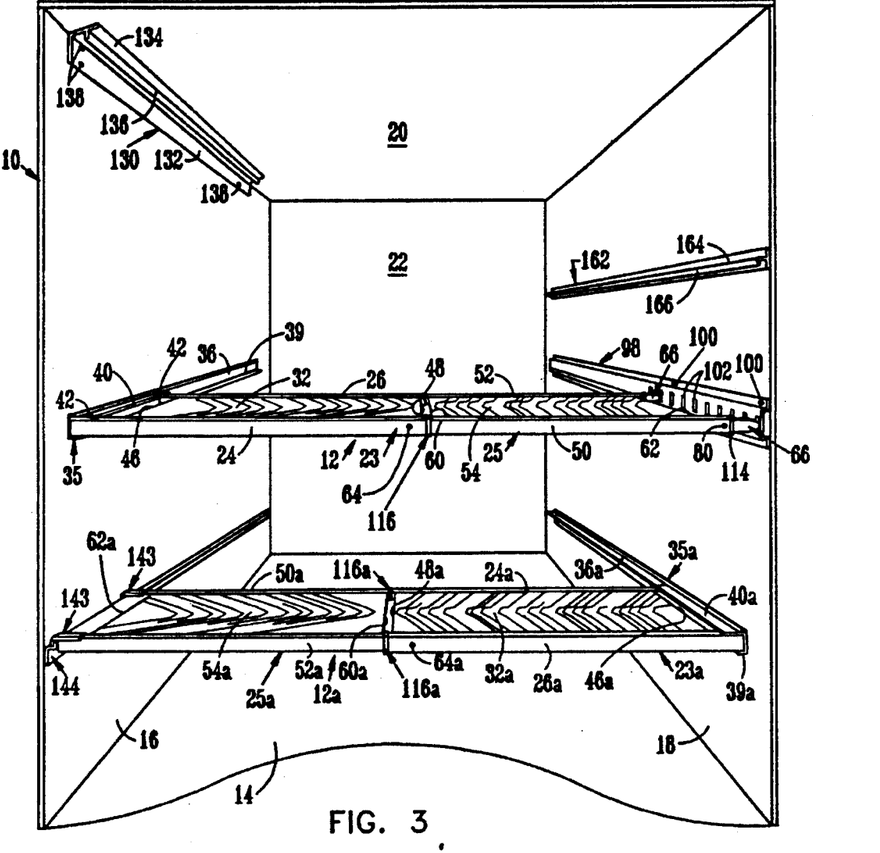
FIG. 3 is an elevation perspective view, similar to FIGS. 1 and 2, of a portion of the interior of a trailer van, and showing the simultaneous use of a first or lower intermediate deck and a second or upper intermediate deck.
Figure 13:
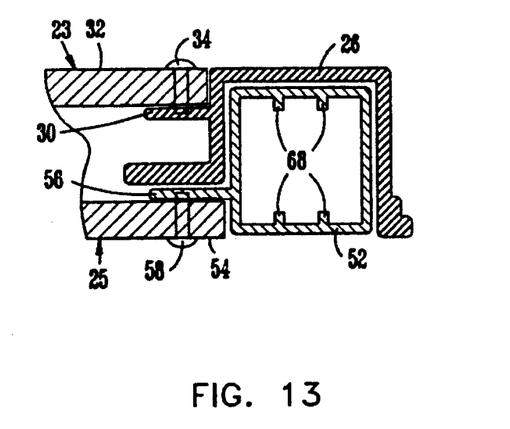
FIG. 13 is a fragmentary, horizontal section view of the intermediate deck structure illustrated in FIG. 1, taken along the line 13—13 thereof, and looking in the direction of the arrows.

As shown in FIGS. 1, 2 and 3, the illustrative trailer van 10 is provided with the usual fixed loading deck or bed 14 which is enclosed by side walls 16 and 18, a roof 20 and a front wall 22. As shown in FIGS. 1, 2 and 3 the intermediate deck 12 includes a first section, generally indicated by the numeral 23, and a second section, generally indicated by the numeral 25. The first section 23 of the intermediate deck 12 includes a pair of elongated laterally spaced apart side frame members 24 and 26 which are channel shaped in cross section, with the open end thereof, facing downwardly. The side frame members 24 and 26 have a transverse top wall, an outer side wall of a first height and an inner side wall of a second height shorter than said first height of the outer side wall, and may be made from any suitable lightweight material, as for example aluminum or magnesium. A load receiving panel 32 is operatively mounted between the side frame members 24 and 26, and it may be made from any suitable material, as for example plywood with metal clad bottom skin. The load receiving panel 32 is seated along its outer longitudinal edges on integral longitudinal side flanges 30 formed on the inner side walls of the side frame members 24 and 26, as illustrated in FIG. 13 for the side frame 26. The load receiving panel 32 is releasably secured to the flanges 30 on the side frame members 24 and 26 by any suitable means, as by a plurality of suitable machine screws or rivets 34 which have their heads resting on the upper surface of the panel 32.

Figure 6:
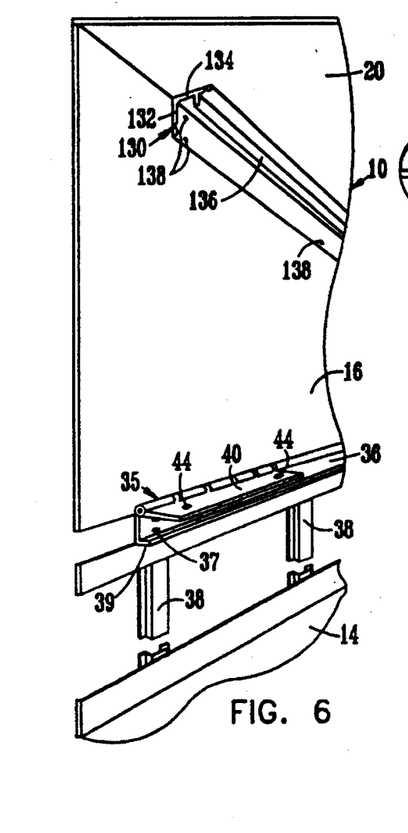
FIG. 6 is a fragmentary, broken, perspective view of the structural details for pivotally mounting the intermediate decks of the invention on a trailer van wall.

As illustrated in FIGS. 1 and 2, the outer end of the first section 23 of the intermediate deck 12 is pivotally mounted on the trailer van left side wall 16 by a hinge means, generally indicated by the numeral 35. As illustrated in FIG. 6, the hinge means 35 includes a horizontal hinge angle rail which includes a vertical leg 36 and an integral horizontal leg 39. The hinge angle vertical leg 36 is fixedly secured to the van side wall posts 38 of the side wall 16 by suitable fasteners 37. The hinge means 35 further includes a hinge plate 40 which is pivotally mounted on the top end of the vertical leg 36 of the hinge rail, and it is fixedly secured to the side frame members 24 and 26 of the first section 23 of the intermediate deck 12 by a pair of carriage bolts 42 FIG. 3 provided with suitable lock nuts and which are mounted through holes 44 (FIG. 6) in the hinge plate 40 and mating holes in the side frame member 24 and 26. As illustrated in FIGS. 1 and 3, the load receiving panel 32 is shorter in length then the side frames 24 and 26, and the outer end thereof is designated by the numeral 46, and the inner end thereof is designated by the numeral 48. The longitudinal integral flanges 30 on the frame members 24 and 26 (FIGS. 11,12,13) are equal in length to the load receiving panel 32.

Figure 12:
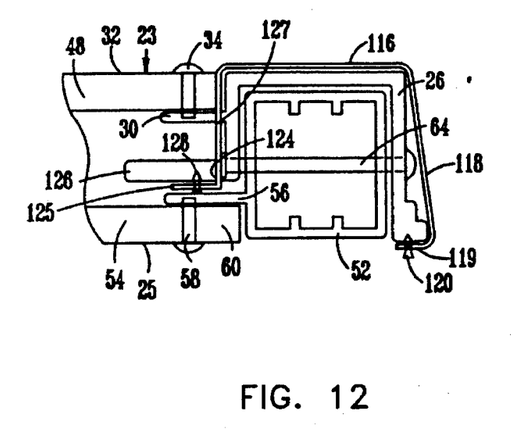
FIG. 12 is a fragmentary, horizontal upper end view of the intermediate deck structure illustrated in FIG. 1, taken along the line 12—12 thereof, and looking downward in the direction of the arrows.

The second section 25 of the intermediate deck 12 includes a pair of elongated laterally spaced apart side frame members 50 and 52 which are tubular in cross section. The side frame members 50 and 52 may be made from the same material as the side frame members 24 and 25 of the first section 23. A load receiving panel 54 is operatively mounted between the side frame members 50 and 52, and it may be made from the same material used for load panel 32 of the first section 23. The load receiving panel 54 is seated along its outer longitudinal side edges on integral longitudinal flanges 56 formed on the inner sides of the side frame members 50 and 52, as illustrated in FIGS. 12 and 13 for the side frame member 52. The load receiving panel 54 is releasably secured to the flanges 56 by any suitable means, as by a plurality suitable machine screws or rivets 58 which have their heads resting on the upper surface of the load receiving panel 54. As illustrated in FIGS. 1 and 2, the load receiving panel 54 is shorter in length than the side frame members 50 and 52, and the outer end thereof is designated by the numeral 62 and the inner end thereof is designated by the numeral 60. The longitudinal integral flanges 56 on the side frame members 50 and 52 (FIG. 13) are equal in length to the load receiving panel 54.

As illustrated in FIG. 2, the inner end of the second section 25 of the intermediate deck 12 is pivotally connected to the inner end of the first section 23 of the intermediate deck 12 by suitable pivot pins. As shown in FIG. 12, a pivot pin, designated by the numeral 64, pivotally attaches the second section side frame member 52 to the first section side frame member 26. FIGS. 1, 2 and 3 show a similar pivot pin 64 attaching the side frame member 50 of the second section 25 of the intermediate deck 12 to the side frame member 24 of the first section 23 of the intermediate deck 12.

Figure 10:
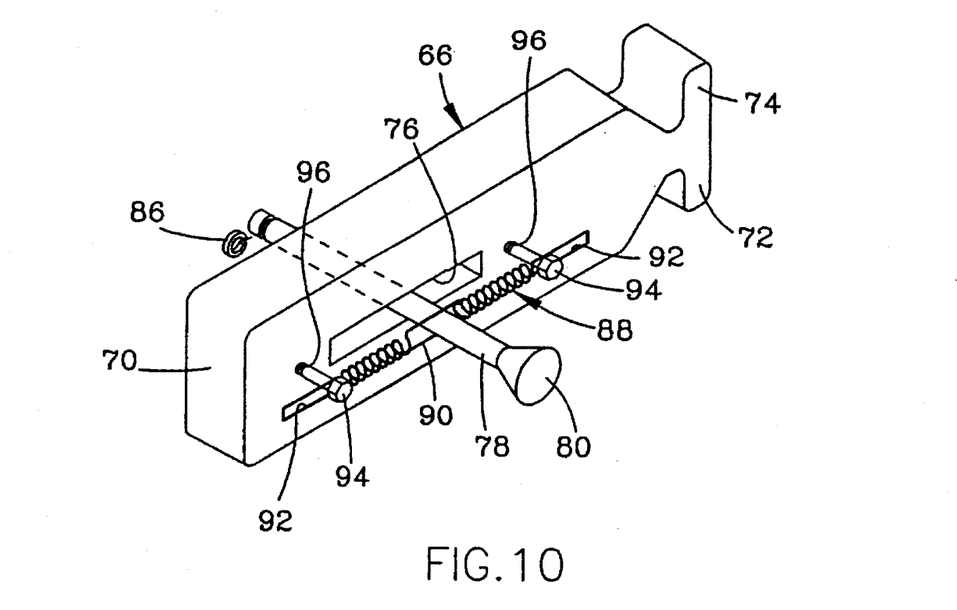
FIG. 10 is an elevation perspective view of a solid type of load bracket illustrated in FIG. 5, and showing the details of a modified embodiment of said load bracket with easy replacement spring means mounted on the side thereof.
Figure 11:
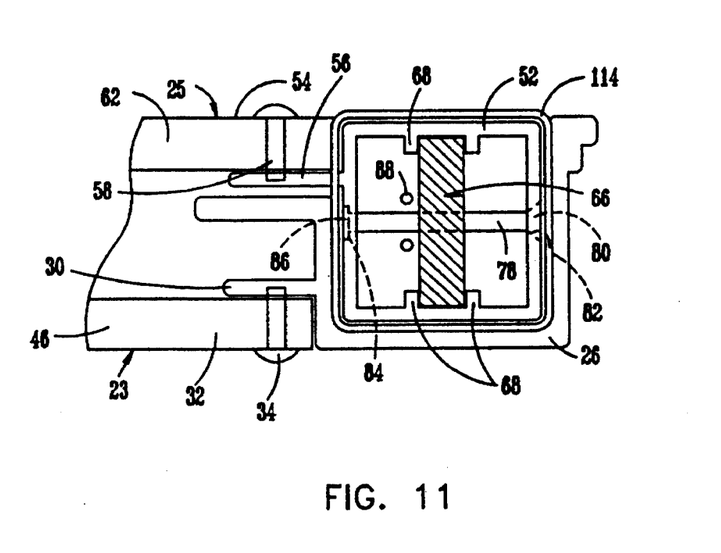
FIG. 11 is a fragmentary, horizontal lower end view, partly in section, of the intermediate deck illustrated in FIG. 1, taken along the line 11—11 thereof, and looking upward in the direction of the arrows.

As shown in FIGS. 1, 2 and 3, the side frame members 50 and 52 of the second section 25 of the intermediate deck 12 are each provided with a spring loaded, telescoping load bracket, generally indicated by the numeral 66. As best seen in FIG. 10, the load bracket 66 includes an elongated solid body which is rectangular in cross section, and substantially rectangular in side elevation view. As shown in FIG. 11, the side frame member 52 of the second section 25 of the intermediate deck 12 is provided with a pair of integral inwardly extended longitudinal guide ribs 68, extending inwardly from the upper and lower inside surfaces of the tubular side frame member 52, so as to form 3 parallel guide slots. The other tubular side frame member 50 for the second section 25 of the intermediate deck 12 is formed similarly. As illustrated in FIG. 11, a telescoping load bracket 66 is adapted to be slidably mounted in one of the equal sized slots formed by the guide ribs 68 in both of the tubular side frame members 50 and 52. As best seen in FIG. 10, the load brackets 66 are each provided with a rear end 70 which is formed at right angles to the upper and lower ends of said load brackets. Integrally formed on the front end of each of the load brackets 66 is a downwardly extended integral hook 72 and an upwardly extended integral identical hook 74. The overall height of the hook end of a load bracket, from the bottom end of hook 72 to the top end of hook 74, is slightly shorter than the vertical length of the slots 102 (FIG. 5) in the load track rail 98 so that the hooks 72 and 74 do not become unhooked under load conditions.

The load brackets 66 are movably mounted in their respective elongated tubular side frame tubular members 50 and 52. The load brackets 66 are prevented from accidentally being moved out of their respective tubular side frame members 50 and 52 by a transverse retainer pin 78 which is extended through an elongated transverse travel slot 76 formed in an intermediate position lengthwise of the load brackets 66. As shown in FIG. 11, the retainer pins 78 extend through suitable openings 82 and 84 in the side walls of the respective tubular side frame members 50 and 52. The retainer pins 78 are held in position axially by an integral head 80 on one end thereof and suitable retainer clip 86 mounted around the other end thereof. As illustrated in FIG. 11, the enlarged head 80 of the retainer pins 78, and the retainer clips 86, are positioned preferably in recesses in the outer surfaces of their respective tubular side frame members 50 and 52.

As shown in FIG. 10, the load brackets 66 are spring loaded so as to permit the load brackets 66 to be moved longitudinally inward or outward of their respective tubular side frame tubular members 50 and 52, but to be spring extended to meet and engage in the slots 102 (FIG. 5) in the load track rail 98. The numeral 88 generally designates a load spring which is positioned along the right side of a load bracket 66, as viewed from the rear end 70 thereof, for easy field replacement of the spring 88. The transverse retainer pin 78 extends through a longitudinal retainer pin loop 90 formed in the spring 88. The retainer pin loop 90 is centrally located longitudinally of the spring 88. The spring 88 is provided with an elongated anchor pin loop 92 on each end thereof through which is mounted an anchor pin 94 that has a head thereon which seats against the adjacent spring anchor pin loop 92. Each of the anchor pins 94 has a reduced diameter body which is extended into a threadable engagement with a suitable threaded hole, as 96, formed in the adjacent side of the respective load bracket 66, for easy replacement of spring 88 if it fails or loses its functional shape.

As shown in FIG. 3, the outer end of the second section 25 of the intermediate deck 12 is releasably supported by an elongated, conventional logistic load track rail, generally indicated by the numeral 98, that is mounted on the curb side wall 18 of the trailer van 10. As shown in FIGS. 1, 2 and 3, the load track rail 98 is disposed parallel to the hinge rail (36,39), and it is fixedly secured to the trailer van curb side wall 18 by a plurality of suitable fasteners 100. The load track rail 98 is provided with a plurality of evenly spaced apart, vertically formed slots 102 for the reception of the hooks 72 and 74 on the outer end of the load brackets 66 mounted in the outer ends of the tubular side frame members 50 and 52 of the second section 25 of the intermediate deck 12. The hooks 72 and 74 may be quickly and easily inserted into the load track rail slots 102 by lifting the inner end of the second section 25 of the intermediate deck 12 and raising the load bracket hooks 72 and 74 through a pair of the load track rail slots 102 aligned therewith, and lowering the load brackets 66 to permit the lower hooks 72 to engage the lower ends of the pair of load track rail slots 102 to hold the intermediate deck 12 in a secure operative position for carrying a load. If for any reason, such as to better align with the load track rail slots 102, the load brackets 66 are required to be slidably mounted in the left slot in the tubular side frame members 50 and 52, as viewed in FIG. 11, the load brackets 66 may be reversed or turned upside down to put each of the springs 88 in a central slot in the tubular side frame members 50 and 52, and in such a position the hooks 74 on the load brackets 66 would then engage the lower ends of the pair of slots 102 in the load track 98. It will be understood that the telescopic mounting of the load brackets 66 in their respective tubular side frame members 50 and 52 permits the load brackets 66 to be spring moved inwardly or outwardly, as needed, to assist the engagement of the hooks 72 and 74 into mating load track rail slots 102 in the load track rail 98.

Figure 9:
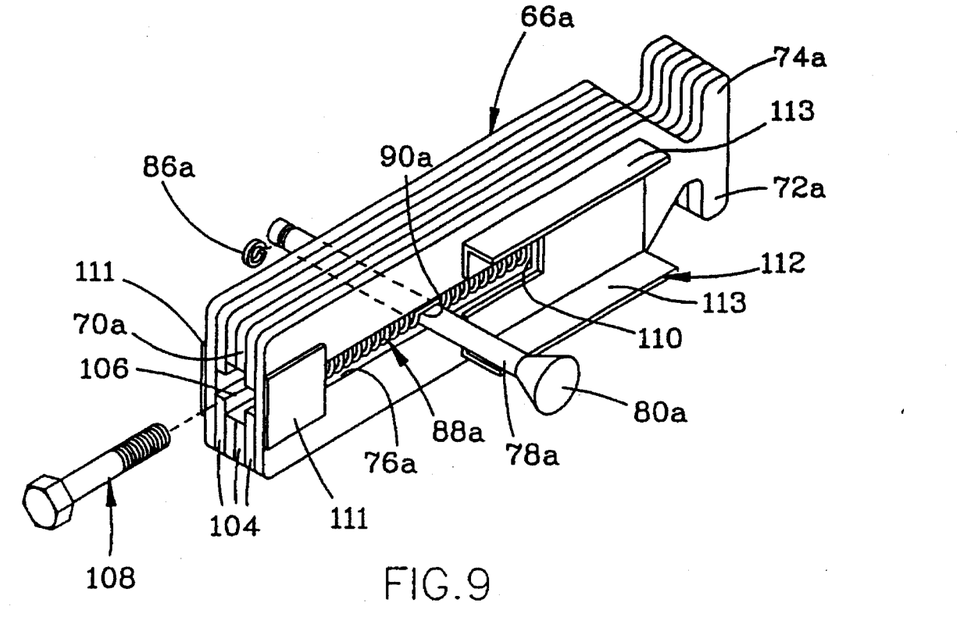
FIG. 9 is an elevation perspective view of a laminated load bracket illustrated in FIG. 5, and showing the improved load bracket provided with a side reinforcement channel means, and an easy spring replacement means.

FIG. 9 is an elevation perspective view of a second embodiment of the load bracket 66, and it is generally designated by the numeral 66a. The parts of the load bracket 66a which are the same as the corresponding parts in the load bracket 66 shown in FIG. 10 are marked with the same reference numerals followed by the small letter "a". The load bracket 66a is formed with an elongated, laminated body comprising a plurality of steel plates 104 which are welded together. A transverse slot 76a is formed through the steel plates 104 of the load bracket 66a, and operatively mounted therethrough is a transversely disposed retainer pin 78a. For a passage to hold the spring 88a in place an elongated, longitudinal bore 106 is formed in the welded plates 104 of the load bracket 66a and it extends inward from the rear end 70a. A load spring 88a is mounted in the longitudinal bore 106 and it is provided with a retainer pin loop 90a which is formed in a central position lengthwise of the spring 88a. The inner end of the spring 88a abuts a wall 110 at the front end of the longitudinal bore 106. The rear end of the spring 88a is engaged by the end of a self tapping bolt 108 which is threadably mounted in the rear end of the longitudinal bore 106. In case of a failure of the spring 88a it may easily be replaced by removing the self tapping bolt 108 and the pin 78a to permit new spring 88a to be mounted in an operative position in the longitudinal bore 106.

The load bracket 66a shown in FIG. 9 is provided with a pair of reinforcement plates 111 which are welded to the outer sides of the rear end of the outer walls of the load bracket 66a. The load bracket 66a is further provided with a reinforcement side channel, generally indicated by the numeral 112, which is welded to the right side of the body of the load bracket 66a, as viewed from the rear end 70a thereof. The reinforcement side channel 112 includes a pair of vertically spaced apart, horizontally disposed flanges 113 which are adapted to slide on the inner ends of the guide ribs 68 formed in the tubular side frame members 50 and 52, to provide the load bracket 66a with additional strength, to resist bending of the same if the intermediate deck 12 is accidentally hit with a sideward force by a fork lift truck or other object. The channel flanges 113 also increase the horizontal bearing surface area of a load bracket 66a, by having the flanges 113 slide on the inner ends of the guide ribs 68 in the tubular side frame members 50 and 52, which eases the stress concentration problem on the aluminum tubular side frame members 50 and 52 due to the cantilever mounting of the load brackets 66a in the last mentioned tubular side frame members.

Figure 5:
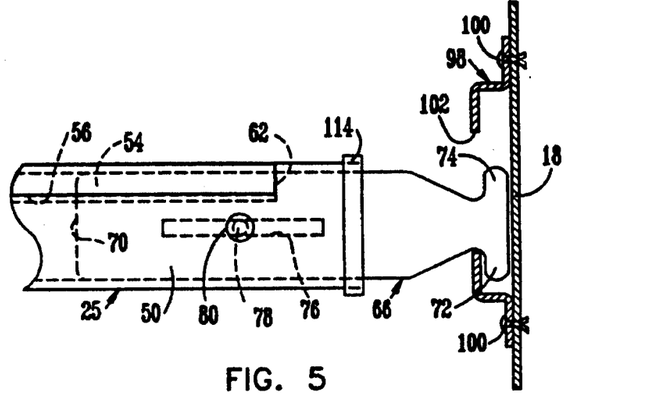
FIG. 5 is a fragmentary, enlarged, side elevation view of the type of load bracket employed in the intermediate deck illustrated in FIG. 1 and in the second or upper intermediate deck illustrated in FIG. 3, and showing the load bracket operatively engaging a load track rail on a trailer van wall.

As illustrated in FIGS. 5 and 11, the tubular side frame members 50 and 52, of the second section 25 of the intermediate deck 12, are each provided on the outer ends thereof, at a position outward of the end 62 of the load receiving panel 54, with a reinforcing steel band designated by the numeral 114. The steel reinforcing bands 114 are fixedly mounted on the ends of the tubular side frame members 50 and 52 by any suitable method, as by being press fitted over the outer ends of the last mentioned tubular side frame members. The steel reinforcing bands 114 provide added strength to the upper end wall of the tubular side frame members 50 and 52, since there is a stress concentration on the softer, upper end walls of the tubular side frame members 50 and 52, due to the fact that the load brackets 66 are cantilevered out from, and press against the inside end of said tubular side frame members at a position above the load brackets 66. The steel reinforcing bands 114 eliminate any cutting or peeling back of the upper end walls of the tubular side frame members 50 and 52, which are made from a softer, lightweight material, such as aluminum or magnesium. The reinforcing steel bands 114 prevent failure, as in the prior art decks, of the side frame members 50 and 52 at the outer ends thereof, due to fatigue, accidental hits on the deck section 25 by a forklift truck or the like, and overloading of the deck 12. The steel reinforcing bands 114 are also shown in FIGS. 2 and 3.

As shown in FIG. 3, when the intermediate deck 12 is in an operative position for receiving a load thereon, the inner ends of the tubular side frame members 50 and 52, of the second deck section 25 are cantilevered outwardly from the inner ends of the channel shaped side frame members 24 and 26 of the first section 23 of the deck 12. The last described cantilevered structural arrangement between the channel shaped side frame members 24 and 26 and the tubular side frame members 50 and 52 creates a stress concentration on the upper end wall of the channel shaped side frame members 24 and 26. In order to prevent failure of the upper end wall of the channel shaped side frame members 24 and 26, a pre-formed, steel reinforcing, inverted U-shaped band, generally indicated by the numeral 116, is mounted around the inner ends of the channel shaped side frame members 24 and 26. The reinforcing bands 116 are positioned inwardly and spaced apart from the inner end 48 of the load receiving panel 32 of the first deck section 23. FIG. 12 shows the details of the steel reinforcing, U-shaped band 116 mounted on the inner end of the channel shaped side frame member 26 of the first section 23 of the deck 12, and it will be understood that the steel reinforcing, U-shaped band 116 for the other channel shaped side frame member 24 is constructed and mounted on the channel shaped side frame member 24 in the same manner. As shown in FIG. 12, the steel reinforcing, U-shaped band 116 is mounted around the top of the channel shaped side frame member 26 and has an outer side leg 118 that has a transverse flanged end 119 which is fixedly secured by a suitable fastener 120 to the lower end of the outer side wall of the channel shaped side frame member 26. An inner side leg 127 of the steel reinforcing, U-shaped band 116 is mounted around the inner side wall of the channel shaped side frame member 26, and it extends through a slot 124 formed through the integral flange 126 that is formed on the inside leg of the channel shaped side member 26. The lower end of the inner side leg 127 of the steel reinforcing, U-shaped band 116 has an integral flange 125 which is secured to the bottom side of flange 126 of the channel shaped side frame member 26 by any suitable means, as by a suitable fastener 128 which is put in place from the bottom side of the flange 125. The steel reinforcing, U-shaped bands 116 prevent fatigue of the inner end of the upper end wall of the channel shaped side frame members 24 and 26 of the first deck section 23 and permit heavier loading of the deck 12.

As shown in FIG. 1, the intermediate loading deck 12 is folded up against the trailer van side wall 16 to a stored position, and it is releasably retained in the stored position by means of an elongated angle style locking rail, generally indicated by the numeral 130, and a conventional spring slam bolt means, generally indicated by the numeral 131. The angle style locking rail 130 is advantageous because the structural configuration thereof saves several inches in height over the conventional "J" rail used to retain the conventional spring bolt means. The angle style elongated locking rail 130 includes a vertical leg 132 (FIGS. 2 and 6) which has a horizontal leg 134 integrally attached at a right angle to the upper end thereof. The angle style elongated locking rail 130 is positioned with the vertical leg 132 against the trailer van side wall 16 and the horizontal leg 134 against the roof 20 of the trailer van 10, thus providing several addition and usable vertical inches. The angle style elongated style locking rail 130 facilitates the storing of the second section 25 above the hinge means 35, and the practical positioning of two levels of usable intermediate decks, as shown in FIG. 3. The locking rail 130 further includes an integral vertical locking flange 136 which is integrally formed on the lower side of the horizontal leg 134 and which extends downwardly therefrom. The locking flange 136 is of a shorter height than the vertical leg 132 of the angle style elongated locking rail 130, and it is spaced apart inwardly from the vertical leg 132. As shown in FIGS. 3 and 6, the angle style elongated locking rail 130 is fixedly secured to the trailer van side wall 16 by any suitable means, as by a plurality of suitable fasteners 138.

As shown in FIG. 1, the spring slam bolt means 131 is fixed to the under side of the load receiving panel 32 of the first section 23 of the intermediate deck 12 by means of a pair of fasteners 141, at the inner end of the load receiving panel 32. The spring slam bolt means 131 is provided with a conventional latch member 140 which is normally spring biased outwardly of the body of the spring bolt means 131, and which extends upwardly to the inside of the locking flange 136, and rests against the inside surface of the locking flange 136 to hold the intermediate deck 12 in the stored position shown in FIG. 1. The spring slam bolt means 131 is provided with the usual release chain 142 which extends downwardly between the two sections 23 and 25 of the intermediate deck 12, and which is accessible for releasing the spring slam bolt means 131 by swinging the outer end of the second deck section 25 outwardly about the pivot pins 64 to expose the latch release chain 142 and permit a downward pull on the latch release chain 142 to move the latch member 140 downwardly and outwardly to clear the locking flange 136. The latch release chain 142 may be retained against the underside of the load receiving panel 32, by any suitable means, as by a suitable bracket 137 with a U-shaped central portion through which the chain 142 may slide. The intermediate deck 12 may then be pivoted downwardly to a released position as shown in FIG. 2, and thence to an operative position shown in FIG. 3, with the load brackets 66 engaged in mating slots 102 in the load track rail 98. When the intermediate deck 12 is in the stored position shown in FIG. 1, the tubular side frame members 50 and 52 of the second section 25 of the intermediate deck 12 are closely nested, as shown in FIG. 13 within the channel shaped side frame members 24 and 26 of the first section 23, to provide a slender stored configuration for the deck 12. The nesting arrangement of the second section tubular side frame members 50 and 52 within the channel shaped side frame members 24 and 26 of the first section 23 of the intermediate deck 12 provides a stored intermediate deck which does not protrude inwardly into the trailer van from the trailer van side wall 16 as far as the prior art stored folding intermediate decks, whereby the use of applicant's intermediate deck 12 provides a substantial increase in usable cargo space for items carried in a trailer van when a plurality of the intermediate decks 12 are used. As shown in FIG. 1, the first section 23 of the intermediate deck 12 is shorter in overall length then the second section 25 of said intermediate deck 12, so that when the intermediate deck 12 is in the stored position shown in FIG. 1 the load brackets 66 are positioned above the horizontal leg 39 of the hinge rail to maintain the load brackets 66 in positions where the chances are considerably reduced that they may be accidentally hit by the forks on fork trucks loading and unloading a trailer van 10 equipped with intermediate decks 12. Although only one intermediate deck 12 is shown in FIGS. 1 and 2, but it will understood that a trailer van 10 may be provided with a plurality of the intermediate decks 12.

The fact that the load brackets 66 are nested close to the trailer van wall 16 when the intermediate deck 12 is in a stored position prevents them from swinging out and interfering with freight or anything stored at a level below the hinge rail horizontal leg 39. If the intermediate deck 12 is mounted in a trailer van known as a double drop van and having wheel boxes that move up and down, when the trailer van floor is moved up and down for loading and unloading of the trailer van at a loading dock, the stored load brackets 66 are positioned above the hinge rail horizontal leg 39 and they will not interfere with the movable wheel boxes. For trailer vans with wheel boxes, the hinge means 35 is mounted directly over the "up" position of the wheel boxes. It is imperative that in the last mentioned vans no cargo be carried on the van floor as or on the wheel boxes when they move up and down. All cargo must be supported and transported on intermediate decking positioned above the "up" position of the wheel boxes. It is important that the intermediate decking be mounted as close as possible above the height of the "up" position of the wheel boxes to safely support freight regardless of whether the wheel boxes are up or down, and the prior art intermediate decks are not capable of this function.

Figure 8:
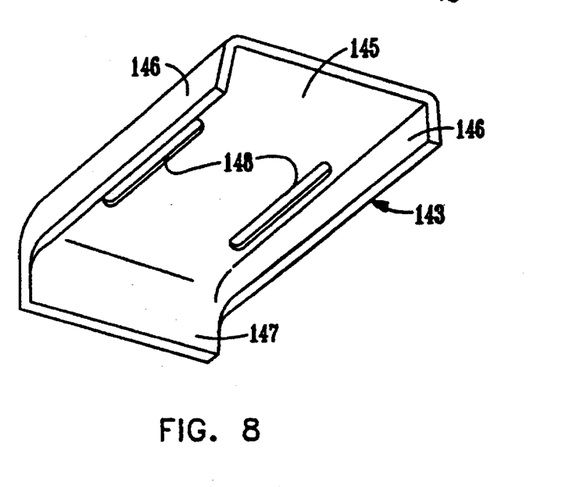
FIG. 8 is a perspective view of the cap style load bracket illustrated in FIG. 7, as viewed from a position looking upward at the lower side of the cap style load bracket illustrated in FIG. 7.

FIG. 3 illustrates the use of two levels of intermediate decks 12 in the trailer van 10. The parts of the second lower intermediate deck 12a which are the same as the first intermediate deck 12 have been marked with the same reference numerals followed by the small letter "a". The lower intermediate deck 12a is positioned with the hinge means 35a on the curb side wall 18 of the trailer van 10. The outer end of the second section 25a of the lower intermediate deck 12a is supported on the trailer van wall 16 by a pair of adjustable, cap style load brackets, generally indicated by the numeral 143, which are operatively supported on an elongated load rail, generally indicated by the numeral 144. As shown in FIG. 8, the cap style load bracket 143 incldes a flat elongated plate body 145 which includes a pair of integral side walls 146 that extend downwardly along the longitudinal edges of the plate body 145. A downwardly extended lip 147 is integrally formed on the front end of the plate body 145 and it extends downwardly from the plate body 145 at a perpendicular angle. A pair of laterally spaced apart bolt slots 148 are formed through the flat elongated plate body 145 of the cap style load bracket 143.

Figure 7:
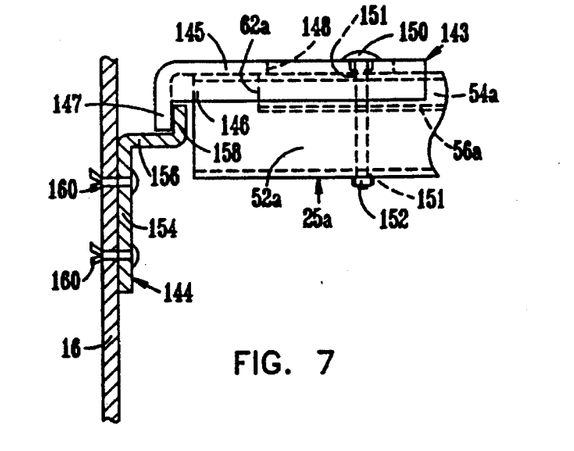
FIG. 7 is a fragmentary, enlarged, side elevation view of a cap style load bracket employed in the first or lower intermediate deck illustrated in FIG. 3, and showing the cap style load bracket operatively engaging a load track rail on a trailer van wall.

As shown in FIG. 7, the cap style load bracket 143, is mounted on the outer end of the tubular side frame member 52a, and it is adjustably secured in place by a pair of bolts 150 which extend through the slots 148 and bolt holes 151 formed through the upper and lower end walls of the tubular side frame member 25a. The bolts 150 are provided with suitable lock nuts 152. As shown in FIG. 7, the cap style load bracket 143 is adapted to have the downwardly extended lip 147 seated over and engaged with the elongated load rail, generally designated by the numeral 144, which may also be termed a "Z" rail because of its Z-shaped cross section. The "Z" rail 144 includes a vertical elongated leg plate portion 154 which is fixedly secured, by any suitable means, as by a plurality of suitable fasteners 160, to the trailer van wall 16. Integrally formed on the upper end of the elongated leg plate portion 154 of the load rail 144 is an inwardly extended elongated horizontal flange 156. Integrally formed on the inner end of the horizontal flange 156 is an upwardly extended lip or flange 158, which is perpendicular to the horizontal flange 156 and parallel to the leg plate portion 154. As shown in FIG. 7, the downwardly extended lip 147 on the load bracket 143 seats over and engages the upwardly extended flange 158 when the second section 25a of the lower deck 12a is in the operative position shown in FIG. 3. It will be understood that the other tubular side frame member 50a on the second deck section 25a is also provided with a cap style load bracket 143, as shown in FIG. 3.

A cap style load bracket 143 functions with the "Z" load rail 144 to prevent the trailer van walls 16 and 18 from bowing outward under load conditions on the lower deck 12a. Also, the cap style load bracket 143 will not retract under load conditions so as to drop the lower deck 12a and its load onto cargo positioned therebelow. The cap style load bracket 143 fits snugly into the channel shaped side frame members 24a and 26a when the lower deck 12a is moved to the stored position against the trailer van wall 18.

As shown in FIG. 3, a locking rail, generally indicated by the numeral 162, is mounted on the trailer van curb side wall 18 in a position to releasably hold the operating latch on a conventional spring slam bolt (131a) (FIG. 4) mounted on the underside of the load receiving panel 32a of the first section 23a of the lower intermediate deck 12a. The locking rail 162 is a conventional load bracket rail known in the intermediate deck art as a "J rail". The locking rail 162 includes a vertical plate 164 which is secured to the trailer van curb side wall 18 by any suitable fastener means. The locking rail 162 further includes an integral angle member which has one leg integrally formed on the plate 164 and extends horizontally inward of the trailer van wall 18, and at the inner end of which is formed a downwardly and vertically disposed integral mounting flange or lip 166.

When an upper intermediate deck 12 and a lower intermediate deck 12a are simultaneously employed, the lower deck 12a may be first loaded with cargo before the upper deck 12 is folded from the stored position to the operative load position, shown in FIG. 3. If the cargo mix is such, the intermediate deck of the invention allows three selective loading variations, namely, (a) load only the lower deck 12a; (b) load only the upper deck 12 as shown by the right segment of FIG. 4; or (c) load both the upper deck 12 and lower deck 12a as shown in FIG. 3 and the left segment of FIG. 4. The lower deck 12a may be folded upwardly to a stored position against the trailer van curb side wall 18, in the same manner as described hereinbefore for moving the upper deck 12 to a stored position against the trailer van wall 16.

Figure 4:
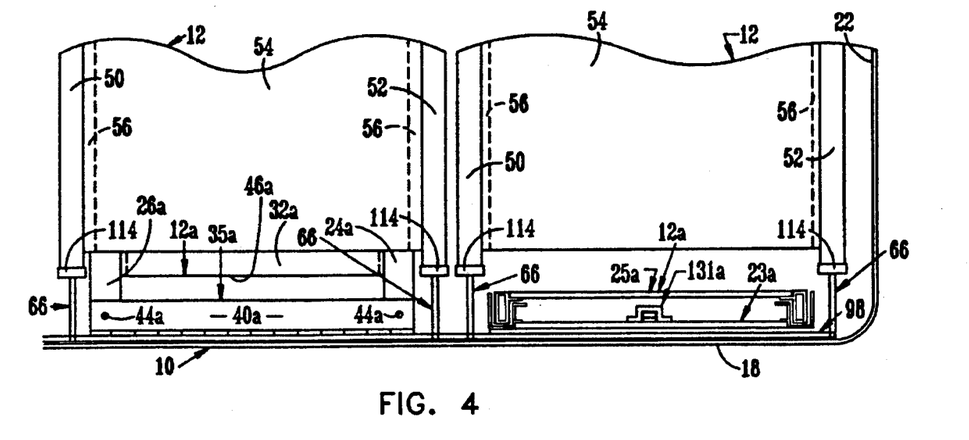
FIG. 4 is a fragmentary, plan view of the right or curb side wall of a trailer van and showing, on the left side thereof fragmentary portions of an upper and a lower intermediate deck in horizontal positions, to show the lower deck or both decks can be loaded, and on the right side thereof a fragmentary portion of an upper intermediate deck in a horizontal position, and a lower intermediate deck in a stored position, to show that it is possible to load the upper deck while storing a lower deck having a narrower width.

FIG. 4 shows the selective options for loading two levels of intermediate decks 12 and 12a. FIG. 4 is a fragmentary, plan view of the curb side wall 18 of the trailer van 10, and showing on the left side thereof, fragmentary portions of an upper intermediate deck 12 and a lower intermediate deck 12a in horizontal operative positions. On the right side thereof, a fragmentary portion of an upper intermediate deck 12 is shown in a horizontal operative position, and a lower intermediate deck 12a is shown in a stored condition against the trailer van wall 18. The stored lower intermediate deck 12a is shown as provided with a conventional spring slam lock bolt 131a for releasably securing the last mentioned stored deck 12a in a locking relationship with the locking rail 162, in the same manner as described for the use of the spring slam bolt 131 in the heretofore description of the storing action of the upper intermediate deck 12. In FIG. 4, the lower intermediate decks 12a are shown as being of a narrower width than the upper intermediate decks 12, so that one or more of the lower intermediate decks 12a may be retained in a stored position, when the upper intermediate decks 12 are used.

In the claims, the term "freight compartment" includes freight vehicles, trucks, trailer vans, railway cars, freight containers, and the like.

What is claimed is:

1. A load bracket (66) for being telescopically and movably mounted in one end of each of a pair of side frame members (50,52) of an intermediate deck (12) for supporting one end of the intermediate deck (12) on a load track rail (98) having vertical slots (102) and which is fixedly mounted on the side wall (18) of a freight compartment, comprising:

(a) an elongated body having a rectangular cross section with a vertical axis greater than a transverse axis, and having a rear end and a front end;

(b) said elongated body having a pair of integral load track slot engaging hooks (72,74) formed on the front end thereof, with one hook (74) extended upwardly, and the other hook (72) extended downwardly, on said vertical axis;

(c) said elongated body being provided with a transverse, longitudinal extended travel slot (76) formed in an intermediate position lengthwise of the elongated body;

(d) the load bracket (66) is provided with a retainer pin (78) which is mounted transversely through the transverse longtitudinally extended travel slot (76) in the load bracket (66) body, and which retainer pin (78) is adapted for mounting through one of said side frame members (50,52) to prevent the load bracket (66) from being accidentally moved out of said one side frame member (50,52); and, (e) the load bracket (66) is provided with a longitudinally extending spring (88) which has each end thereof secured to the load bracket body by an anchor pin (94), the spring (88) is formed with a retainer pin loop (90) which is centrally located longitudinally of the spring (88), said retainer pin (78) extends through the retainer pin loop (90) in the spring (88) for positioning the load bracket (66) in an initial position relative to said one side frame member (50,52), but which permits the load bracket (66) to be moved longitudinally inward or outward relative to said one side frame member (50,52) from said initial position to an operative engagement with said load track rail (98).

2. A load bracket (66) as defined in claim 1, wherein:

(a) the body of the load bracket (66) is formed as a solid body.

3. A load bracket (66) as defined in claim 2, wherein:

(a) the spring (88) is mounted on one side of the load bracket (66) for easy changing of the spring (88).

* * * * *